United States Patent [19]

Debey

[11] Patent Number: 5,108,344
[45] Date of Patent: Apr. 28, 1992

[54] LEG OF LAMB CUT AND METHOD OF BONING SAME

[75] Inventor: Donald D. Debey, Parker, Colo.

[73] Assignee: Mountain Meadows Lamb Corporation, Denver, Colo.

[21] Appl. No.: 671,962

[22] Filed: Mar. 19, 1991

[51] Int. Cl.$^5$ .............................................. A22C 17/00
[52] U.S. Cl. ..................................... 452/135; 452/136
[58] Field of Search ................. 452/135, 136, 137, 172

[56] References Cited

U.S. PATENT DOCUMENTS

| | | | |
|---|---|---|---|
| Re. 27,873 | 1/1974 | Weits et al. | 452/135 |
| 511,927 | 1/1894 | Brendon | 452/135 |
| 1,435,877 | 11/1922 | Reubold | 452/135 |
| 2,419,424 | 4/1947 | Staab | 452/135 |
| 2,857,619 | 10/1958 | Massengill | 452/136 |
| 2,893,051 | 7/1959 | Massengill | 452/136 |
| 3,210,801 | 10/1965 | Terranova | 452/135 |
| 3,300,317 | 1/1967 | Franklin | 452/135 |
| 3,456,284 | 7/1969 | Werner et al. | 452/135 |
| 3,811,152 | 5/1974 | Herubel | 452/136 |
| 4,275,479 | 6/1981 | Korhonen | 452/149 |
| 4,389,749 | 6/1983 | Korhonen | 452/135 |
| 4,594,751 | 6/1986 | Ketels | 452/138 |
| 4,628,569 | 12/1986 | Gagliardi, Jr. | 452/149 |
| 4,669,150 | 6/1987 | Manmoto et al. | 452/136 |
| 4,958,477 | 9/1990 | Winkler | 452/35 |

Primary Examiner—Willis Little
Attorney, Agent, or Firm—Fields, Lewis, Pittenger & Rost

[57] ABSTRACT

In accordance with this invention a method of preparing a leg cut of meat for cooking and serving from which all bones except the shank bone have been removed but wherein the cut retains its general shape of an unboned leg of meat is provided. A generally longitudinal cut is made along the inside surface of the leg into the location of the femur from the top round thereof to the bottom round thereof, as viewed when the leg is hung from a meat hook. Next, a cut is made into the joint between the shank and the femur and the flesh is opened to expose the upper round of the femur. The upper round is engaged with a meat hook. Downward pressure is applied on the femur with the meat hook while a cut is made through the joint. The femur is peeled out of the leg with the meat hook and the bone is removed. The meat cut can then be secured together by tying or wrapping to hold it in substantially the same shape it had prior to boning. Thus, a novel cut of meat is provided comprising a leg of meat from which the femur has been removed through a cut along the inside of the leg, with the shank remaining in place. This product is particularly desirable for a leg of lamb.

10 Claims, 2 Drawing Sheets

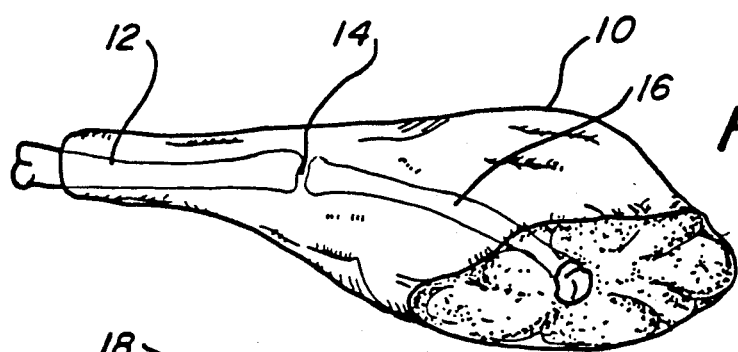
Fig_1
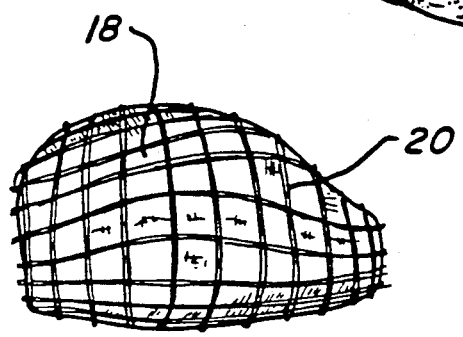
Fig_2
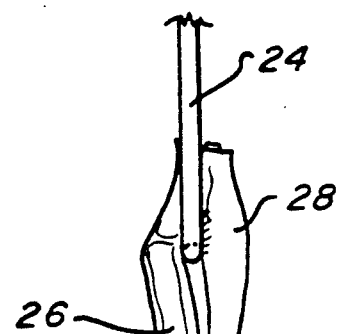
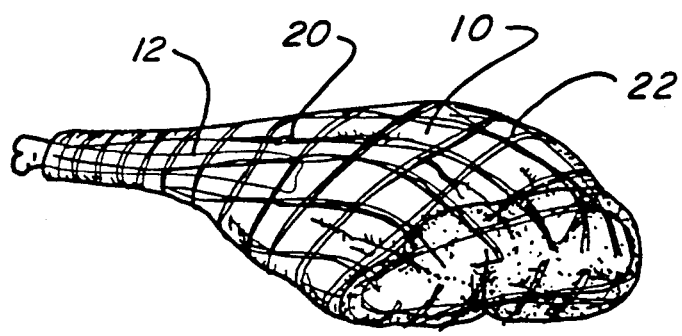
Fig_3
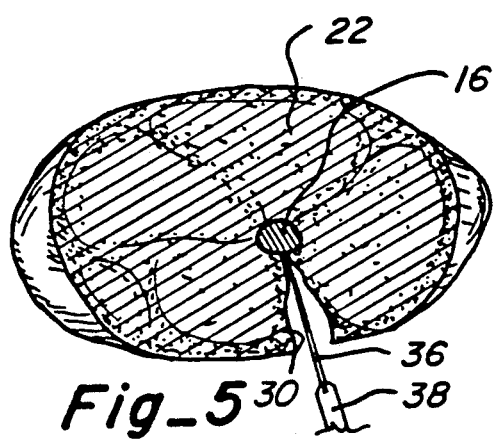
Fig_5
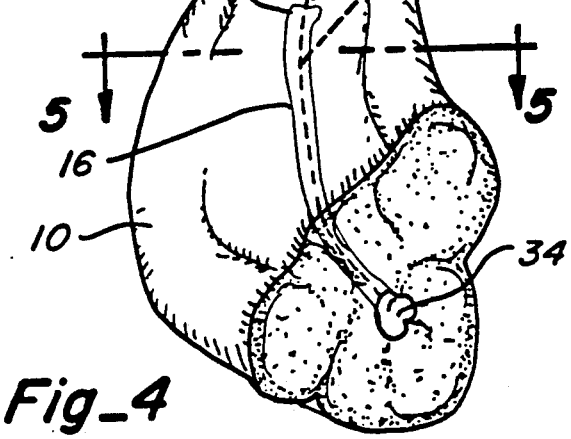
Fig_4

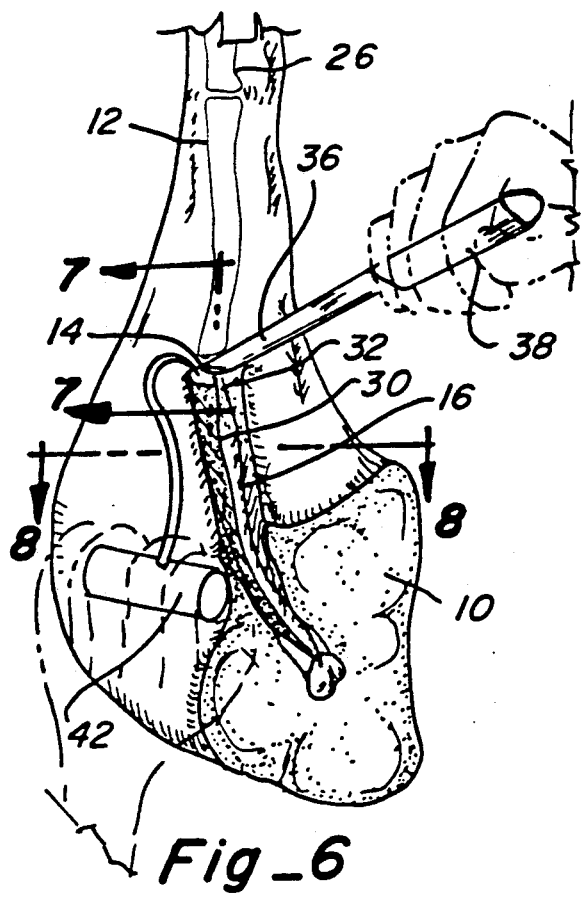
Fig_6
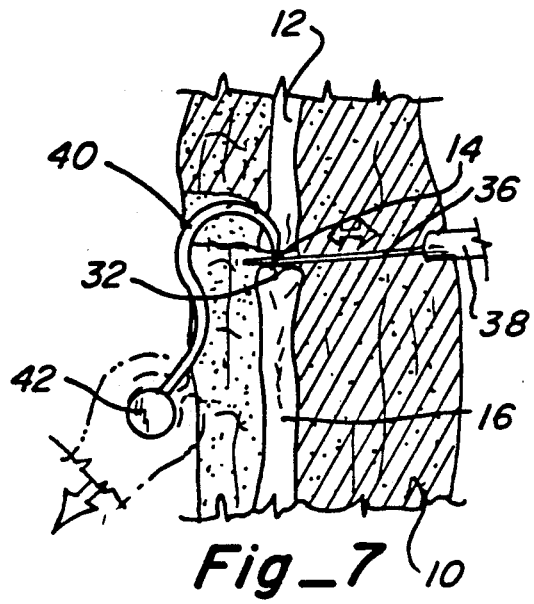
Fig_7
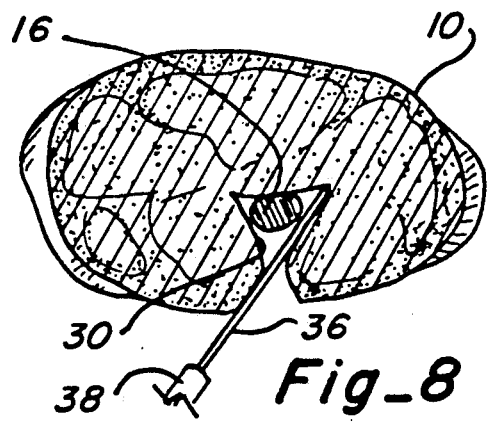
Fig_8
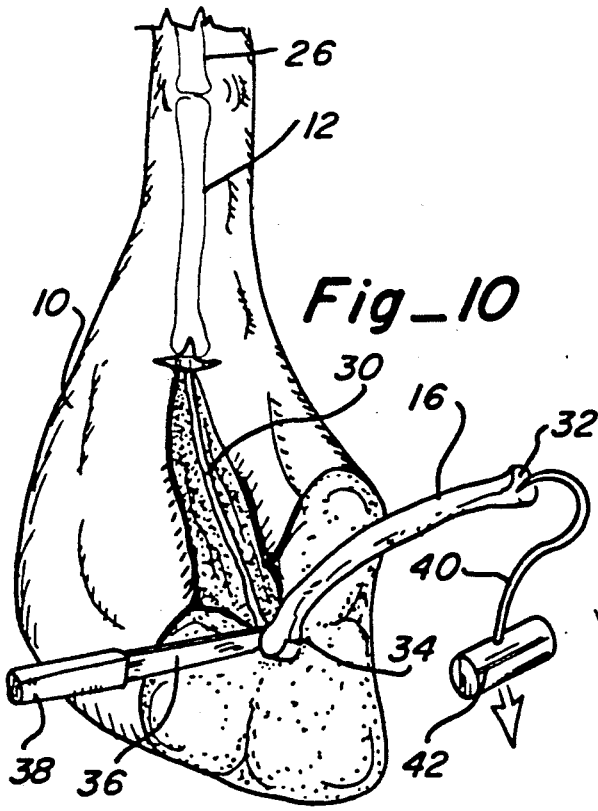
Fig_10
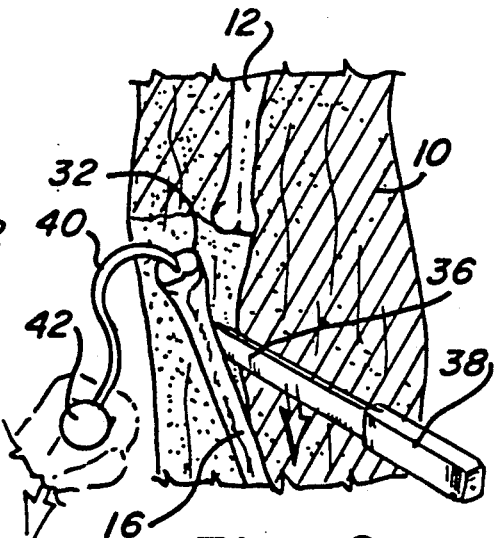
Fig_9

LEG OF LAMB CUT AND METHOD OF BONING SAME

TECHNICAL FIELD

This invention relates to a novel cut of meat and particularly to a new cut for a leg of lamb.

BACKGROUND ART

Many boneless leg cuts of meat have been provided. The advantage of boneless leg cuts of meats is that unnecessary weight is removed with respect to shipping and packing. More importantly, the boneless meat is easier to carve both when served in the home and in restaurant trade.

The disadvantage of a boneless leg cut of meat is that it almost never retains the general shape and appearance of the original leg cut of meat with the bone in. This is undesirable, particularly in those instances where the leg cut of meat after preparation and cooking is to be displayed at the time it is served, such as in a buffet line at a restaurant or hotel. This is of particular importance when leg of lamb is served. It is desirable to display it at the time of carving in a manner in which it has the appearance of a leg of lamb. However, with the bone in, the lamb is difficult to carve and there is much waste of meat. On the other hand, when the bone is removed, and the leg of lamb is wrapped, it takes on the approximate shape of a football. Thus, the meat product no longer has the distinctive appearance of a leg of lamb and therefore is less desirable even if it is easier to carve.

A prior art method for boning a ham and retaining its shape is shown in U.S. Pat. No. 511,927 to Brendon. This is accomplished by removing the femur and shank bones followed by coring out the tibia and thigh bone.

U.S. Pat. No. 2,419,424 to Staab discloses another method of boning a ham to retain its shape wherein two small lateral cuts are made at opposite ends of the thigh bone.

The following patents are all directed to apparatus for boning a ham. U.S. Pat. No. RE.27,873 to Weits et al. discloses a device for removing bones from shoulders and legs of beef and ham. The bones can be removed in sections. U.S. Pat. No. 1,435,877 to Reubold and U.S. Pat. No. 3,456,284 to Werner et al. each disclose a circular arrangement of knives which cut along the bones so that they can be removed. A somewhat similar device is shown in U.S. Pat. No. 3,210,801 to Terranova. U.S. Pat. No. 2,857,619 and U.S. Pat. No. 2,893,051, both to Massengill disclose apparatus for pulling bones out of a ham.

U.S. Pat. No. 4,628,569 to Gagliardi, Jr. discloses a method of butchering a side of lamb and discloses the cuts obtained by this method. However, none of them disclose a leg of lamb in which the shank bone is retained and all other bones removed in a manner wherein the leg of lamb substantially retained its original shape and appearance.

Thus, while each reference discloses a method or apparatus which is suitable for its intended purpose, none of them are directed to removing all bones except the shank bone from a leg of lamb and presenting it in a manner in which it substantially retains its original shape and appearance.

DISCLOSURE OF THE INVENTION

In accordance with this invention a method is provided of preparing a leg cut of meat for cooking and serving from which all bones except the shank bone have been removed but wherein the cut still retains the general shape of an unboned leg of lamb. The flank, channel fat, gland fat, aitch bone and vertebrae are first removed in the usual manner. The invention then comprises the steps of making at least one generally longitudinal cut along the inside surface of the leg into the location of the femur from the top round thereof to the bottom round thereof, as viewed when the leg is hung from a meat hook. Next, a cut is made into the joint between the shank and the femur and the flesh is opened to expose the upper round of the femur. The upper round is engaged with a meat hook. Downward pressure is applied on the femur with the meat hook while a cut is made through the joint. The femur is peeled out of the leg with the meat hook and the bone is removed. The meat cut can then be secured together by tieing or wrapping to hold it in substantially the same shape it had prior to boning.

Advantageously, with this method, a leg cut of meat, particularly a leg of lamb, can be substantially boned, except for the shank, so that an attractive appearing leg of lamb can be provided after preparation and cooking, such as at a buffet. Since the major bones have been removed, the leg of lamb can easily be carved on the buffet line while retaining its pleasing appearance and shape. In this manner, a novel cut of a leg of lamb is provided which has heretofore been unknown.

Additional advantages of this invention will become apparent from the description which follows, taken in conjunction with the accompanying drawings.

BRIEF DESCRIPTION OF THE DRAWINGS

FIG. 1 is a diagrammatic perspective view of an unboned leg of lamb;

FIG. 2 is a perspective view of a boneless leg of lamb;

FIG. 3 is a perspective view of the novel cut of leg of lamb of this invention;

FIG. 4 is a side elevation of a leg of lamb hung on a hook prior to preparation in accordance with this invention;

FIG. 5 is a horizontal section, taken along line 5—5 of FIG. 4, showing the first cut into the inside surface of the leg of lamb along the femur;

FIG. 6 is a fragmentary side elevation showing the cutting through the joint connecting the femur and the shank;

FIG. 7 is a fragmentary, enlarged, vertical section, taken along line 7—7 of FIG. 6, showing the top round of the femur being pulled away by a meat hook after cutting through the joint;

FIG. 8 is a horizontal section, taken along line 8—8 of FIG. 6, showing the manner in which further cutting is accomplished around the femur;

FIG. 9 is an enlarged fragmentary side elevation showing the femur being pulled from the leg; and FIG. 10 is a fragmentary side elevation showing the final removal of the femur from the leg.

BEST MODE FOR CARRYING OUT THE INVENTION

A standard unboned leg of meat, such as a leg of lamb 10 is shown in FIG. 1 which has a shank 12 connected at a joint 14 to a femur 16. Such a leg of lamb can be prepared and cooked and displayed attractively. However, because of the presence of the femur in the fleshy portion of the leg, it is difficult to cut the meat without substantial waste and difficulty.

An alternative to this is to completely bone the leg of lamb, such as boned lamb 18, shown in FIG. 2. After boning, this lamb is secured together, as by tieing or with a webbing 20. As is readily apparent, this boned leg of lamb looses all appearance of a leg of lamb but instead has an oval football shape. Thus, while a boned leg of lamb, can be easily sliced for serving, it does not have an attractive appearance when served and generally is not suitable for serving on a buffet line.

FIG. 3 shows a leg of lamb 10 from which the femur has been removed from the inside leaving only the shank 12. Conveniently, this leg of lamb is wrapped or tied, such as by webbing 22 which maintains the leg of lamb 10 in substantially the same shape as the same leg of lamb, shown in FIG. 1, prior to boning. Thus, the leg of lamb of FIG. 3 can be prepared, cooked and served in an attractive manner yet is easily to carve or slice since the femur is not in the way.

To form the leg of lamb cut in accordance with this invention, the leg of lamb is most conveniently hung on a hook 24, as shown in FIG. 4, so that the hook extends between the trotter 26 and tendon 28, as shown. When initially hung on the hook, the leg of lamb will also have the flank, channel fat, gland fat, aitch bone and vertebrae still attached. These parts are not shown in FIG. 4 since they will be removed in a manner common in the trade. Next, a longitudinal cut 30 is made along the femur 16 from the top round 32 to the bottom round 34 by the blade 36 of a knife 38, as best shown in FIGS. 4 and 5. Advantageously, this cut 30 is made on the inside of the leg so that after removal of the femur the outside of the leg, which is the side that shows when displayed at a buffet, will be unmarked and in its original condition. Next, a cut is made into joint 14 to open the flesh and expose the upper round 32 of the femur 16. This upper round 32 is then engaged by a meat hook 40, all as shown in FIG. 7. While pulling on handle 42 to exert a downward pressure on the femur 16 with hook 40, the knife blade 36 is used to cut the flesh from around the femur, as shown in FIGS. 8 and 9. The femur is then peeled out of the leg by continuing downward pressure thereon with hook 40 and finally removed from the leg.

The trotter can then be removed and the leg wrapped or tied with a netting, such as netting or webbing 22 of FIG. 3. Thus, after the procedure is completed, the leg of lamb will have the appearance shown in FIG. 3 and be ready for preparation and cooking. Once cooked, the leg of lamb can be served on a platter whereupon it will retain its pleasing appearance for serving at a buffet or other public function. In addition, with the femur removed, the meat can easily be carved for serving, minimizing waste and improving the convenience of carving.

From the foregoing, it can be seen that a novel leg cut of lamb has been provided which is heretofore been unknown. The cut is much more pleasing to the eye than a boneless leg of lamb. However, it is just as easy to carve as a boneless leg of lamb yet retains the appearance of a leg of lamb in which the bone is left in.

This invention has been described in detail with reference to a particular embodiment thereof, but it will be understood that various other modifications can be effected within the spirit and scope of this invention.

I claim:

1. A method of preparing a leg cut of meat for cooking and serving, wherein the flank, channel fat, gland fat, aitch bone and vertebrae have been removed, the leg of meat having an outside surface and an inside surface, said method comprising the steps of:
    making at least one generally longitudinal cut along the inside surface of the leg into the location of the femur from the top round of the femur to the bottom round thereof, as viewed when the leg is hung from a meat hook;
    cutting into the joint between the shank and the femur and opening the flesh to expose the upper round of the femur;
    engaging the upper round of the femur with a meat hook;
    apply downward pressure on the femur with the meat hook while cutting through the joint;
    peeling the femur out of the leg with the meat hook; and
    removing the femur.

2. A method, as claimed in claim 1, wherein:
    the meat cut is a leg of lamb.

3. A method, as claimed in claim 1, including the further step of:
    securing the meat cut to hold it in substantially the same shape it had prior to boning.

4. A method as claimed in claim 3, wherein:
    said holding is accomplished by wrapping or tying.

5. A method of preparing a substantially boneless leg cut of meat which substantially retains its original shape and appearance prior to boning, said method comprising:
    hanging the leg of meat from a hook;
    removing the flank, channel fat and gland fat;
    removing the aitch bone and vertebrae;
    making at least one generally longitudinal cut along the inside surface of the leg into the femur from the top round of the femur to the bottom round thereof, as viewed when the leg is hung from a meat hook;
    cutting into the joint between the shank and the femur and opening the flesh to expose the upper round of the femur;
    engaging the upper round of the femur with a meat hook;
    applying downward pressure on the femur with the meat hook while cutting through the joint;
    peeling the femur out of the leg with the meat hook;
    removing the femur; and
    removing the trotter.

6. A method, as claimed in claim 5, including the further step of:
    securing the meat cut to hold it in substantially the same shape it had prior to boning.

7. A method of removing a femur from a leg of meat while substantially preserving the shape and appearance prior to boning, said method comprising:
    making at least one generally longitudinal cut along the inside surface of the leg into the location of the femur from the top round of the femur to the bottom round thereof, as viewed when the leg is hung from a meat hook;
    cutting into the joint between the shank and the femur and opening the flesh to expose the upper round of the femur;
    engaging the upper round of the femur with a meat hook;
    applying downward pressure on the femur with the meat hook while cutting through the joint;
    peeling the femur out of the leg with the hook; and removing the femur.

8. A method, as claimed in claim 7, wherein:
the meat cut is a leg of lamb.

9. A method, as claimed in claim 7, including the further step of:

securing the meat cut to hold it in substantially the same shape it had prior to boning.

10. A method as claimed in claim 9, wherein:
said holding is accomplished by wrapping or tying.

* * * * *